United States Patent [19]

Davies et al.

[11] Patent Number: 4,496,411
[45] Date of Patent: Jan. 29, 1985

[54] BEAD JAMMING OR CRIMPING METHOD

[75] Inventors: Richard A. Davies, Union City, Tenn.; Michael W. Lee, Arlington, Ky.; Frank A. Rodenberger, Woodland Mills, Tenn.; James R. Hill, Hokes Bluff, Ala.; David P. Kulavich, Attalla, Ala.; Donald L. Sowell, Jacksonville, Ala.

[73] Assignee: The Goodyear Tire & Rubber Company, Akron, Ohio

[21] Appl. No.: 593,561

[22] Filed: Mar. 26, 1984

Related U.S. Application Data

[62] Division of Ser. No. 423,733, Sep. 27, 1982, Pat. No. 4,452,660.

[51] Int. Cl.³ .............................................. B29H 17/32
[52] U.S. Cl. ..................................... 156/136; 140/88; 156/131; 156/144; 156/175; 156/196; 156/221; 156/247; 156/288
[58] Field of Search ............... 156/136, 422, 433, 441, 156/443, 502, 581, 126, 131, 143, 144, 173, 175, 180, 196, 218, 221, 247, 249, 288, 344; 140/88, 89; 29/33 F, 34 D; 245/1, 5; 152/362 R; 425/28 B, 357, 394, 395, 398, 400, 443, DIG. 5; 264/320, 326, 282; 57/21, 201

[56] References Cited

U.S. PATENT DOCUMENTS

| | | | |
|---|---|---|---|
| 1,475,873 | 11/1923 | Putt | 156/502 X |
| 1,630,922 | 5/1927 | Burley | 425/395 X |
| 2,572,984 | 10/1951 | Byers | 425/398 |
| 2,902,083 | 9/1959 | White | 156/136 |
| 2,996,107 | 8/1961 | Dieckmann | 156/502 |
| 3,170,662 | 2/1965 | Anderson | 245/1.5 |
| 3,429,765 | 2/1969 | Mallory et al. | 156/136 X |
| 3,719,542 | 3/1973 | Schmitz et al. | 156/502 |
| 3,975,127 | 8/1976 | Munk et al. | 425/357 X |
| 4,221,627 | 9/1980 | Rost | 156/507 |

Primary Examiner—William A. Powell
Assistant Examiner—Thomas Bokan
Attorney, Agent, or Firm—Frederick K. Lacher; T. P. Lewandowski

[57] ABSTRACT

A method for crimping tire bead rings in which an inner die member has grooves for holding the bead rings in the area of the bead splices and an upper die member engages the outer surface of the bead rings in that area. The die members are compressed with sufficient force for a sufficient period of time so that the strands of the bead rings are held together by the insulating material around the strands in the area of the bead splices. The side portions of the grooves control the spreading of the bead rings and may be flared to compress and then release the bead rings. The grooves of the inner die member may have movable inserts for ejecting the bead rings. The upper die member may also include grooves in mating engagement with the grooves of the inner die member for enclosing the outer portions of the bead rings at the splice area and provide for release of the bead rings after crimping.

4 Claims, 9 Drawing Figures

FIG.9

BEAD JAMMING OR CRIMPING METHOD

This is a division of application Ser. No. 423,733 filed Sept. 27, 1982, now U.S. Pat. No. 4,452,660.

This invention relates generally, as indicated, to a method for preparing bead rings for assembly in a tire carcass. The bead rings have been made by winding strands of a high strength, relatively nonextensible, material such as wire coated with an insulating material which may be rubber. Then it has been the practice to wrap the bead strands with a suitable material such as fabric coated with rubber. The wrapping process has been slow and cumbersome and the machinery used for wrapping requires a substantial amount of maintenance so that the cost of wrapping bead rings is substantial. Also the strings from the wrapping fabric have caused defects in tires.

In accordance with an aspect of this invention, there is provided a bead crimping apparatus for a bead ring having strands coated with an elastomeric material and coiled in a plurality of convolutions with the inside ends of the strands positioned at the radially inner surface of the ring and the outside ends of the strands positioned at the radially outer surface of the ring, said inside ends and said outside ends being located for simultaneous engagement by an upper die member and an inner die member having an inner groove with a generally cylindrical base portion and radially extending side portions, means to move said inner die member and said upper die member together in mating engagement for compressing said strands between said side portions and against said base portion and means for separating said inner die member and said upper die member for removal of said ring from said groove.

In accordance with another aspect of this invention, there is provided a method of crimping a bead ring having strands coated with an elastomeric material and coiled in a plurality of convolutions with the inside ends of the strands positioned at the radially inner surface of the ring and the outside ends of the strands positioned at the radially outer surface of the ring comprising hanging said bead ring over an inner groove of said inner die member, compressing said coated strands in said inner groove between the side portions of said groove by pressing an upper die member against said bead ring, compressing said inside ends and said outside ends of the strands against said bead ring by movement of said upper die member and said inner die member together, and removing said bead ring from said inner groove of said inner die member.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and, as will become apparent to those skilled in these arts, can be modified in numerous ways within the spirit and scope of the invention defined in the claims hereof.

Figure 1:
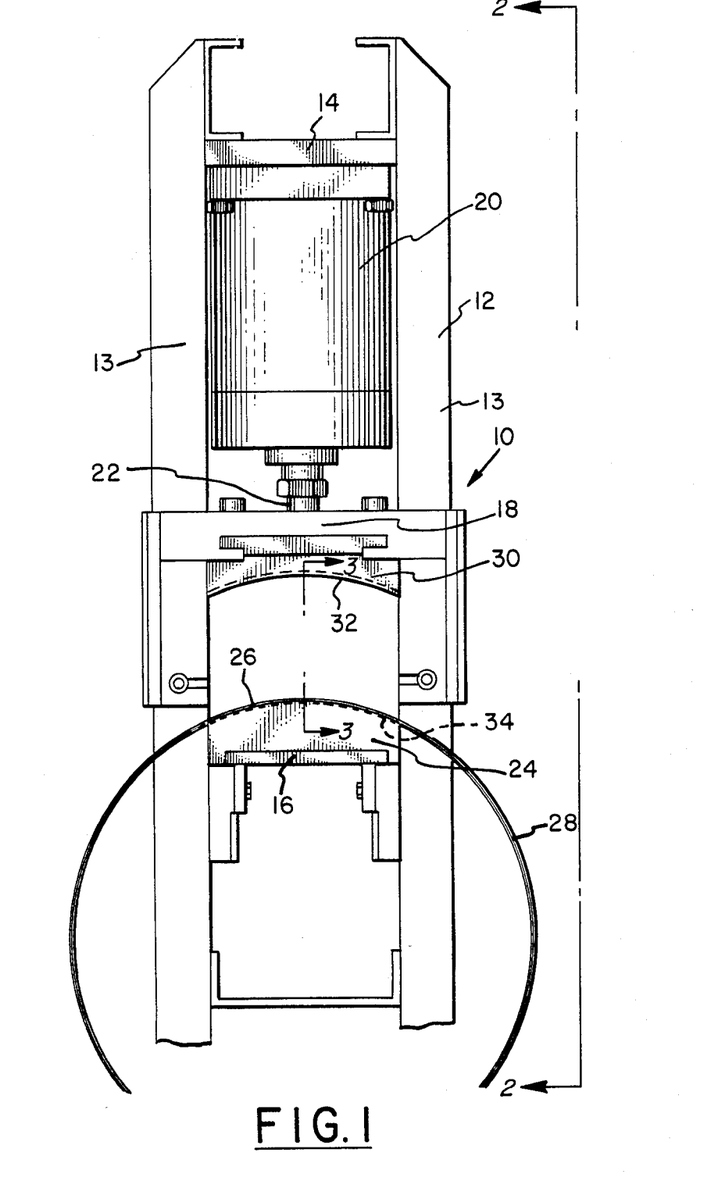
FIG. 1 is a front elevation of an apparatus embodying the invention with parts being broken away.
Figure 2:
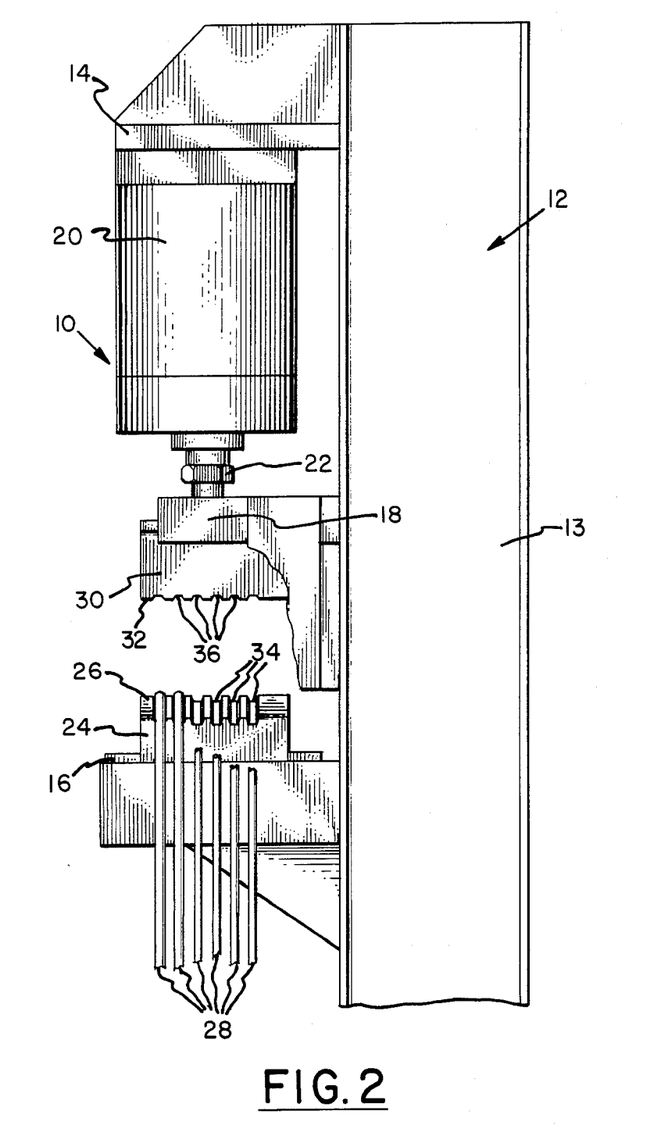
FIG. 2 is a side elevation taken along the line 2—2 of FIG. 1 with parts being broken away.

Referring to the drawings and especially FIGS. 1 and 2, a bead crimping apparatus 10 representing a preferred embodiment of the invention is shown. The apparatus 10 includes a frame 12 having vertical members 13 which may be fastened to the floor by suitable means and an upper support member 14 and a lower support member 16 mounted on the vertical members. A sliding support member 18 is disposed between the upper support member 14 and lower support member 16 and is mounted on the vertical members 13 for sliding movement in a vertical direction. An air cylinder 20 is mounted on the upper support member 14 and has a piston rod 22 connected to the sliding support member 18 for moving it toward and away from the lower support member 16.

An inner die member 24 is mounted on the lower support member 16 and has a curved upper surface 26 with a curvature of substantially the same radius as the curvature of bead rings 28 which are hung over the inner die member 24 for crimping. An upper die member 30 is mounted on the sliding support member 18 and has a curved lower surface 32 which has a curvature conforming to the curvature of the upper surface 26 of the inner die member 24.

Figure 4:
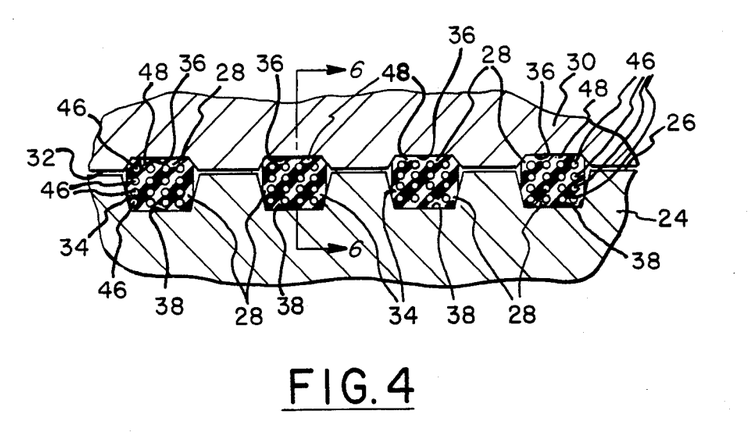
FIG. 4 is a view like FIG. 3 with the die members compressing the bead rings.

A plurality of spaced inner grooves 34 are positioned in spaced-apart relationship along the curved upper surface 26 of the inner die member 24. A plurality of outer grooves 36 are positioned in spaced relationship along the curved lower surface 32 of the upper die member 30. As shown in FIG. 4, the inner grooves 34 and outer grooves 36 are in alignment so that upon closing of the die the bead rings 28 will be enclosed in cavities, portions of which are in the inner grooves and portions of which are in the outer grooves.

Preferably each of the inner grooves 34 has a generally cylindrical base portion 38 and radially extending side portions 40. The side portions 40 are flared outwardly at a suitable angle X relative to a plane perpendicular to the axis of the curved upper surface 26 which may be in the range of from about 5 to 15 degrees and in this embodiment is about 10 degrees. Accordingly the width of the base portion 38 of each of the inner grooves 34 is less than the width of the inner grooves at the curved upper surface 26. In the embodiment shown the width of the base portion 38 is about 0.260 inches and the width of the inner grooves 34 at the upper surface 26 is about 0.340 inches. The depth of each of the inner grooves 34 is about 0.160 inches.

Each of the outer grooves 36 has a generally cylindrical base portion 42 and side portion 44. The side portions 44 are flared inwardly at a suitable angle Y relative to a plane perpendicular to the axis of the curved lower surface 32 which is preferably from about 30 to 50 degrees and in this embodiment is about 38 degrees. The width of the base portion 42 of each of the outer grooves 36 is substantially the same as the width of the base portion 38 of each of the inner grooves 34 and the width of the outer grooves 36 at the curved lower surface 32 is substantially the same as the width of the inner grooves at the curved upper surface 26. Preferably the depth of the inner grooves 34 is greater than the depth of the outer grooves 36 with the depth of the outer grooves being from about one-quarter to one-half the depth of the inner grooves. In the present embodiment the depth of the outer grooves 36 is 0.050 inches and the depth of the inner grooves 34 is 0.160 inches.

Figure 3:
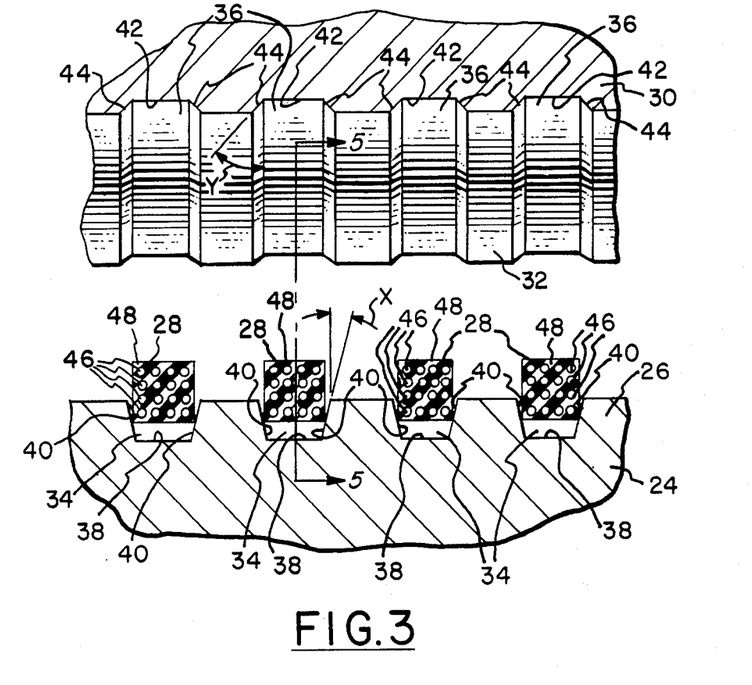
FIG. 3 is an enlarged fragmentary sectional view taken along the line 3—3 in FIG. 1.
Figure 5:
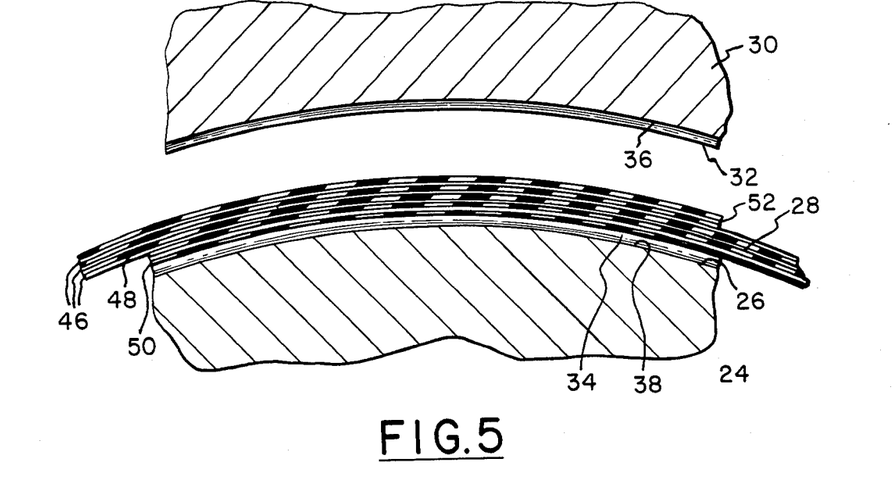
FIG. 5 is a fragmentary sectional view taken along the line 5—5 in FIG. 3.

As shown in FIGS. 3 and 5, the bead rings 28 are hung on the inner die member 24 in the inner grooves 34 and have strands 46 of high strength relatively nonextensible material such as wire wound in coils with an insulating material such as rubber 48 around the strands. As shown in FIG. 5, an inside end 50 of each of the strands 46 is positioned at the radially inner surface of each of the bead rings 28 and an outside end 52 of each of the strands is positioned at the radially outer surface of each of the bead rings. The inner die member 24 and upper die member 30 have a length which is greater than the distance between the inside end 50 and outside end 52 of each of the strands 46. In the present embodiment the inner grooves 34 and outer grooves 36 are 7½ inches long with a 7 inch radius for crimping 4-strand, 5-turn beads built to a diameter of 14.12 inches with an insulation of 0.56 gauge.

Figure 6:
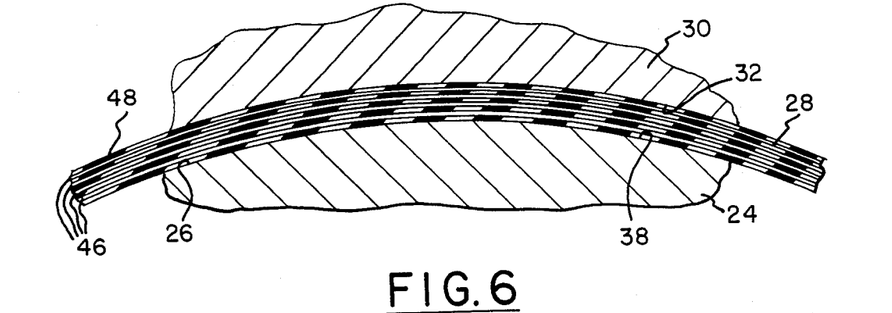
FIG. 6 is a fragmentary sectional view taken along the line 6—6 in FIG. 4.

In operation of the bead crimping apparatus 10, the sliding support member 18 is lifted to the open position, shown in FIGS. 1 and 2, by the air cylinder 20. Each of the bead rings 28 is hung in one of the inner grooves 34 as shown in FIGS. 3 and 5 with the inside end 50 and outside end 52 of each of the strands positioned within the length of the inner die member 24 and upper die member 30. The air cylinder 20 is then actuated to lower the sliding support member 18 with the upper die member 30 into engagement with the bead rings 28 as shown in FIGS. 4 and 6 with sufficient pressure to crimp the ends 50 and 52 and adhere the strands 46 together.

In the present embodiment, the bead rings 28 are jammed together for two to three seconds with one hundred pounds per square inch pressure. During this compression, radially inner portions of the bead rings 28 are compressed in the inner grooves 34 and radially outer portions of the bead rings are compressed in the outer grooves 36. The inside end 50 and outside end 52 of each of the strands 46 are compressed against the body of each of the bead rings 28 and the sides of the bead rings are compressed by engagement with the flared side portions 40 and 44 of the inner grooves 34 and outer grooves 36 to crimp and adhere the strands together. After jamming pressure on the bead rings 28 for a predetermined time the air cylinder 20 is actuated and the sliding support member 18 and upper die member 30 are moved upwardly away from the inner die member 24 attached to the lower support member 16. The bead rings 28 remain in the inner grooves 34 of the inner die member 24; however because of the flared side portions 40 the bead rings may be removed easily by hand or other means from the grooves prior to being built into the tire carcasses in a normal tire building process.

Figure 7:
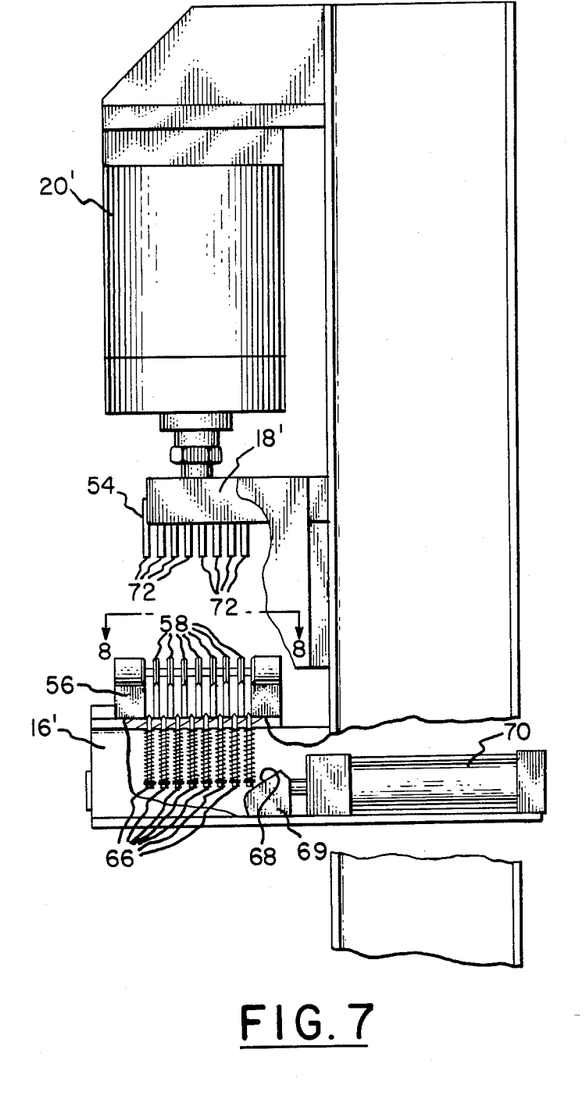
FIG. 7 is a side elevation of a modification of the apparatus shown in FIG. 1 with parts being broken away.
Figure 8:
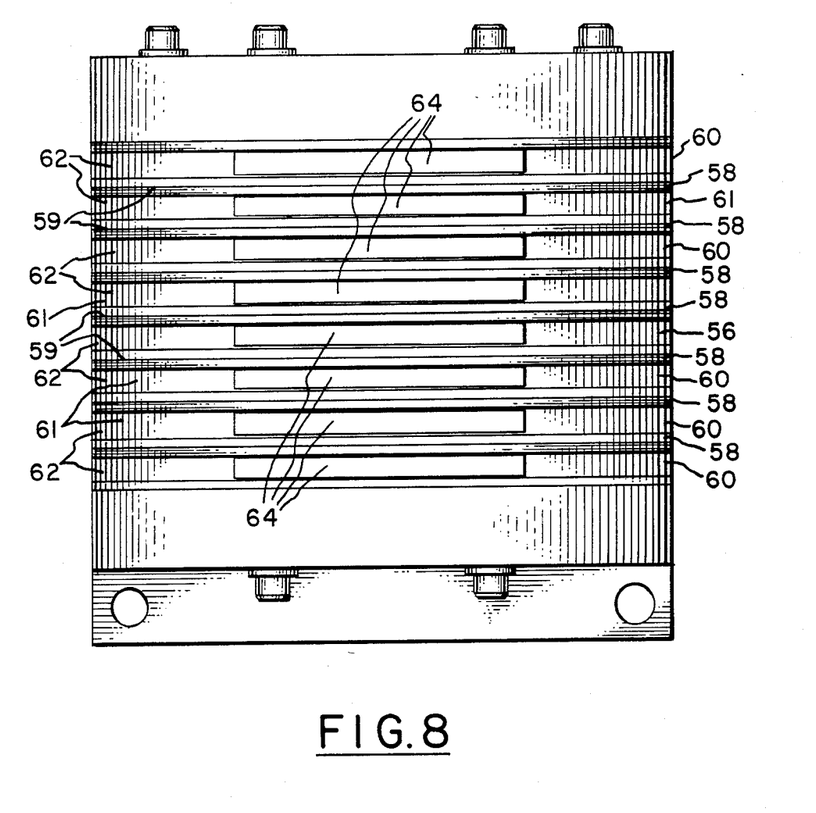
FIG. 8 is an enlarged plan view of the lower die member taken along the line 8—8 in FIG. 7.
Figure 9:
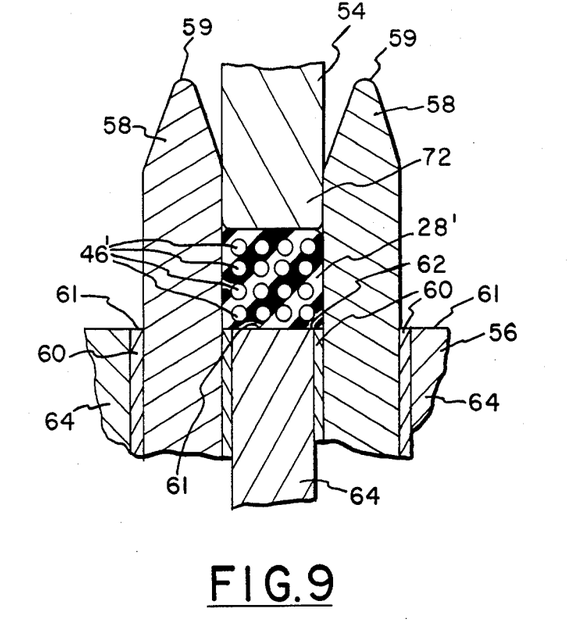
FIG. 9 is an enlarged fragmentary crosssectional view showing a bead compressed by a rib of the upper die between the radially extending side portions in the groove of the lower die.

Referring to FIGS. 7, 8 and 9, a modification is shown in which an upper die member 54 and an inner die member 56 of a modified construction are mounted on the sliding support member 18' and the lower support member 16'. The inner die member 56, shown in greater detail in FIGS. 8 and 9, may be of a laminated construction and have plates 58 with a curved surface 59 of a larger diameter sandwiched between plates 60 with a curved surface 61 of a smaller diameter providing inner grooves 62 for receiving the bead rings 28'. Bead ring ejector plates 64 are slidably mounted in the plates 60 for vertical movement into engagement with the bead rings 28'. Lifters 66 slidably mounted in the lower suport member 16' are engageable by a cam means such as cam surface 68 on piston 69 actuated by pressure in cylinder 70. The cam surface 68 is movable into engagement with the lifters 66 in sequence and thereby the bead rings 28 are ejected one at a time from the inner grooves 62 of the inner die member 56.

The upper die member 54 may also be of a construction having a plurality of curved ribs 72 mounted in spaced relation thereon. The ribs 72 have a generally cylindrical, radially inner striking die surface with a width approximately equal to the width of the inner grooves 62 of the inner die member 56 so that upon closing of the die with the bead rings 28' hanging in the inner grooves, the ribs 72 will compress the bead rings in the grooves and against the plates 60 of the inner die member 56. As shown in FIGS. 7 and 9, the curved surface 59 of each of the plates 58 of the inner die member 56 may be chamfered to provide a tapered entry portion for each of the inner grooves 62 to facilitate hanging of the bead rings 28' on the inner die member and guiding them into the inner grooves.

In operation of this modification, the bead rings 28' are hung over the inner die member 56 in the inner grooves 62 in the open position of the apparatus. The air cylinder 20' is then actuated and moves the upper die member 54 down against the inner die member 56 with the ribs 72 compressing the strands 46' between the plates 58 and against the surface 62 of the plates 60 causing the strands to adhere to one another in the elastomeric material of the bead rings 28'. After compression of the bead rings 28' for a predetermined period of time at a predetermined pressure the upper die member 54 is moved upwardly by the air cylinder 20' to the position shown in FIG. 7. The piston 69 is then moved by pressure in the cylinder 70 causing the cam surface 68 to move to the left as shown in FIG. 7 to engage the lifters 66 which in turn push the ejector plates 64 upwardly and carry the bead rings 28' out of the inner grooves 62. This action further presses the sides of the bead rings 28' against the surfaces of the plates 58 causing further crimping and adherence of the strands 46' together in preparation for use of the bead ring in the manufacture of tires.

It will be seen that in this modification and in the embodiment of FIGS. 1 through 6, the compression of the bead rings 28 and 28' is accomplished under controlled conditions. The compression of the bead rings 28 and 28' is controlled by the side portions 40 and 44 of the inner grooves 34 and outer grooves 36 or by the surfaces of the plates 58. It has been found that bead rings jammed or compressed in this manner do not require wrapping and thereby the necessity for expensive wrapping machines which are hard to maintain is eliminated. Also the step of cutting strings at the edges of the wrapping material is eliminated. Accordingly with this method and apparatus substantial savings in manufacture and improvements in tire quality are obtained.

While certain representatives embodiments and details have been shown for the purpose of illustrating the invention, it will be apparent to those skilled in the art that various changes and modifications may be made therein without departing from the spirit or scope of the invention.

What is claimed is:

1. A method of crimping a bead ring having strands coated with an elastomeric material and coiled in a plurality of convolutions with the inside ends of the strands positioned at the radially inner surface of the ring and the outside ends of the strands positioned at the radially outer surface of the ring comprising hanging said bead ring over an inner groove of an inner die member, compressing said coated strands in said inner groove between the side portions of said groove by pressing an upper die member against said bead ring, compressing said inside ends and said outside ends of the strands against said bead ring by movement of said upper die member and said inner die member together, and removing said bead ring from said inner groove of said inner die member.

2. The method of claim 1 wherein a radially inner portion of said bead ring is compressed in said inner groove and a radially outer portion of said bead ring is compressed in an outer groove of the upper die member.

3. The method of claim 2 wherein said bead ring is compressed by engagement with flared side portions of said inner groove and said outer groove to adhere said strands together.

4. The method of claim 1 wherein said bead ring is removed from said inner groove by pressure on the radially inner surface of said bead ring in the area of said inner groove to further crimp said bead rings while said bead ring is being removed.

* * * * *